Figure 1:
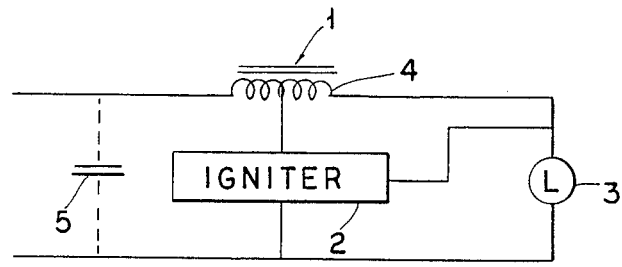

United States Patent [19]

Bonilla Gris

[11] Patent Number: 4,980,612
[45] Date of Patent: Dec. 25, 1990

[54] ENERGY-SAVING BALLAST FOR ELECTRIC GAS DISCHARGE LAMPS

[75] Inventor: Jose L. Bonilla Gris, Lomas Valle Dorado Tlalnepantla, Mexico

[73] Assignee: Lumisistemas, S.A. de C.V., Naucalpan de Juarez, Mexico

[21] Appl. No.: 178,353

[22] Filed: Apr. 6, 1988

[30] Foreign Application Priority Data

Apr. 6, 1987 [MX] Mexico .................................. 5904
Apr. 4, 1988 [MX] Mexico .................................. 10978

[51] Int. Cl.⁵ .......................................... H05B 41/14
[52] U.S. Cl. ................................... 315/240; 315/284
[58] Field of Search .............. 315/274, 209 R, 209 T, 315/240, 284

[56] References Cited

U.S. PATENT DOCUMENTS 4,455,510 6/1984 Lesko ............................ 315/284 X
4,467,245 8/1984 Bloomer et al. ................. 315/240 X
4,525,651 6/1985 Ahlgren ............................ 315/240

Primary Examiner—David Mis
Attorney, Agent, or Firm—Ladas & Parry

[57] ABSTRACT

In a ballast for operating one of a high-pressure sodium-vapor and a mercury-vapor lamp from a source of electric power, the ballast has a first one of a condenser and an inductor connected to be in series between the lamp and the source of electric power. A second of the one of the condenser and inductor is connected in a path that is connected in parallel with the first one of the condenser and inductor. A timer is connected to the source of electric power and a relay is in path for closing the path, the timer providing a predetermined time only to the relay for opening the path, whereby the electric power consumed by the ballast for operating the lamp is reduced when the relay has opened the path.

20 Claims, 14 Drawing Sheets

ENERGY-SAVING BALLAST FOR ELECTRIC GAS DISCHARGE LAMPS

SUMMARY OF THE INVENTION.

This invention applies to a ballast for operating an electric gas discharge lamp which consists of a rectifying and filtering device and a timer that after a predetermined period activates a relay which disconnects one of two inductances on a series reactor circuit, or disconnects one of two capacitances on a self-transforming self-regulating circuit or regulated advanced circuit, in such a way that it reduces the current supplied to the lamp and thus the electric power that this ballast consumes.

BACKGROUND OF THE INVENTION

There are presently ballasts for use in illuminating public and industrial lighting that can save power by using a relay that at certain hours of the night, when vehicular traffic and/or pedestrian or general activities have been decreased, disconnects a capacitance section of the circuit, so that the lamp current is reduced and therefore so does the power thereof, which brings about a reduction in electric power that the ballast bearing luminaire takes from the feeder line, even when the illumination diminishes.

The drawback of this ballast is that the relay mentioned above is operated by remote control through a pilot wire which joins all the ballasts and the signal of which is controlled from a remote place manually or by a clockwork mechanism.

In addition, the other drawback is that the principle of reduction of the strength of the lamp is by means of reducing the capacitance of the ballast, which only allows applying this principle to ballasts with self-transforming self-regulating circuits or regulated advanced circuits (CWA) which are the most expensive in the market.

The purpose of the invention is to eliminate the inconvenience of the installation of the pilot wire, as well as the clockwork mechanism, and also to be able to use ballasts with lower costs in the market, such as series reactor circuits (or inductances in series) by using the principle of inductance variation instead of capacitance variation to achieve the power savings.

The features of this ballast are shown in the following description and in the accompanying diagrams, the same reference signs serving to indicate the same parts in the shown FIGS.

With regard to the types of electric gas discharge lamps generally used, these are three: high-pressure sodium vapor lamps, low-pressure sodium vapor lamps, and those of mercury vapor.

The electric power-saving ballast described below can be used in two of the three types of lamp described above, which are the high-pressure sodium vapor and those of mercury vapor.

As regards the circuits, the power-saving ballast can be used in the regulated advanced circuit type, also known as self-transforming self-regulating or CWA, as well as in the series reactor circuits (inductance series).

Below is described the case of the power-saving ballast in the series reactor circuit.

In FIG 1. is show the diagram of a normal ballast for operating a high-pressure sodium vapor lamp in which one may appreciate the single winding 1 of the ballast due to being a series reactor circuit, the ignitor 2 (an electronic device that is used to produce in combination with the partial winding 4, a high voltage pulse needed to light the lamp), and the lamp 3. The condenser 5 is optional in those cases in which it is necessary to have a ballast with a high potency factor.

Figure 2:
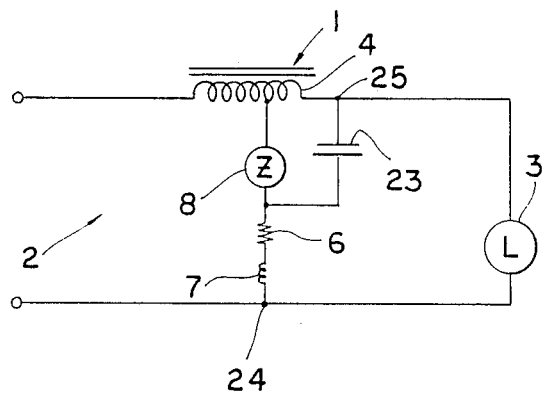

In FIG. 2, there is a diagram of the ignitor 3 mentioned in FIG. 1. This ignitor consists of a condenser 23, a resistor 6, on inductance or coil 7 and a discharge device which in this case is a SIDAC 8 (bidirectional diode of silicon for C.A.).

Figure 3:
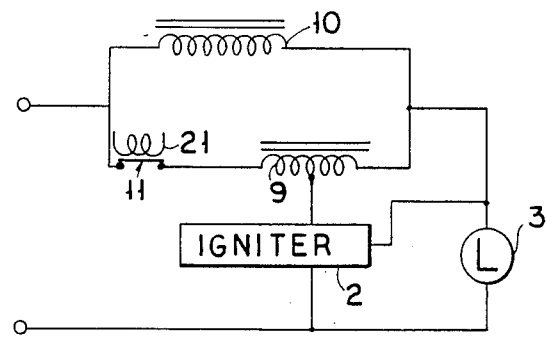

In FIG. 3 there is a diagram of the ballast for high-pressure sodium vapor with the series reactor circuit ((Inductance series) such as that which appears in FIG. 1, but with two important differences, that are the fact of dividing the total inductance 1 of the circuit into two inductances in parallel 9 and 10 the total value of which is the same as the original inductance, and that one of the inductances 9 is connected by one of its ends to inductance 10 by means of the contacts 11 of a relay. These contacts 11 of the relay are those that connect or disconnect the inductance 9 to the rest of the circuit, thus modifying its operation as can be seen further along.

Inductances 9 and 10 can be two electrically-separated windings, but wound or drawn in the same magnetic field, or can be 2 windings independently wound in their own magnetic field.

Figure 4:
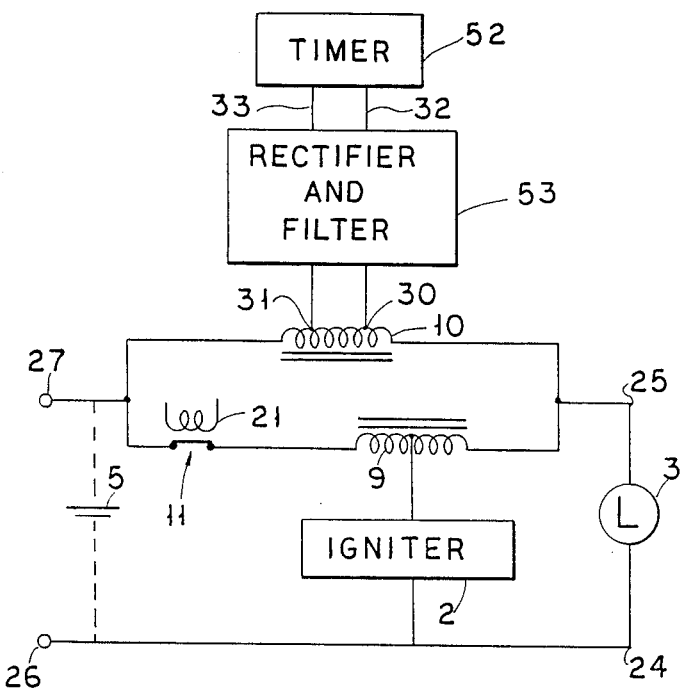

In FIG. 4 is the diagram of the complete ballast, in which one may appreciate inductances 9 and 10, ignitor 2, lamp 3, the breaker or pair of contacts 11 of the relay, a rectifying and filtering device 53, and a timer 52.

The optional condenser 5 to have a ballast with a high potency factor is also shown in the figure.

The manner in which it operates is as follows:

FIRST PHASE. The initial operation of the ballast consists of lighting the lamp. What happens is that upon kicking in the ballast, the line tension produced between points 27 and 26 is transmitted through inductances 9 and 10 and is produced between points 25 and 24, forming the open circuit tension at the ends of lamp 3.

However, the high-pressure sodium lamp only lights when it is supplied with, in addition to that open circuit voltage, a high voltage pulse of between 2000 and 5000 volts (depending on the lamp). The ignitor 2 is the device that in combination with the secondary winding 2 provides this pulse, and it does so in the following way:

In FIG. 2, one sees that the voltage between points 25 and 24 which is the open circuit voltage towards the lamp, is divided between condenser 23, resistor 6, and inductance 7.

Condenser 23 has between its ends an alternating current voltage which is gradually charging with a certain delayed time.

This voltage is found in the ends of the discharge device 8 (SIDAC). This discharge device 8 has the feature that when the voltage in its ends is higher than the the voltage of the discharge of the same device, this passes to a conducitve stage and stays in it as long as the current moving through it does not go below a certain value.

Therefore in an alternating cureent cycle, as that of the point of zero voltage, the voltage between the ends of condenser 18 to which this is charging, is increased from zero volts, and is present in the ends of the discharge device SIDAC 8; when this voltage becomes higher than the minimum value of discharge of the device, SIDAC 8 passes into the conductive stage, allowing through it the discharge of condenser 23 on section 4 of the winding (located between points 25 and 28) producing a voltage pulse of a low value; the number of turns between the winding of point 29 to 28 is many times greater than the winding 4 between points 25 and 28, in such a manner that there is a relationship of transformation of the voltage elevation between those windings and when condenser 23 discharges on winding 4, this pulse increases thanks to the relationship of transformation of the voltage elevation just mentioned, and between points 25-29 a pulse of voltage is obtained elevated many times, which is transmitted through the feeder source until reaching the lamp, forcing it alight.

SECOND PHASE. Having lighted the lamp, it keeps it operating at its normal capacity for a predetermined time which corresponds to the most important activities, and this duty is performed with the following elements: inductances 9 and 10, that regulate the current that circulates through lamp 3, and therefore regulates the potency and lighting emission of same. In this phase contacts 11 are close down as they are N.C. (normally closed).

THIRD PHASE. From the beginning of the operation of the lamp, between points 30-31, there is an alternating current (A.C.) voltage, that device 53 takes care to rectify and filter in such a way as to have between points 30-32 a direct current (D.C.) voltage which is fed to the timer.

This timer has as its objective to activate the stimulation spool (not shown) of the relay after a previously established period, and when it does so the energized relay opens the contacts 11, making inductance 9 disconnect and cease working, and leaving only inductance 10 functioning with which the total inductance of the circuit increases, and as a result the current passing through to lamp 3 is diminished, thus reducing its power. This diminishing of power in lamp 3 is reflected in the entrance of the ballst as well like a decrease in power and therefore as a reduction in the consumption of power.

FOURTH PHASE. When the end of the period of operation of the lighting is reached, the ballast of supply of electric power is disconnected, and the lamp turns off.

Upon the ballast kicking out, the timer returns to its initial state (readjusted to zero) and remains ready to initiate the next cycle; at the same time, the stimulation spool of the relay ceases being energized, and this closes off contacts 11 which are normally closed contacts, inductance 9 joining up with inductance 10, staying connected in parallel all over again.

Figure 5:
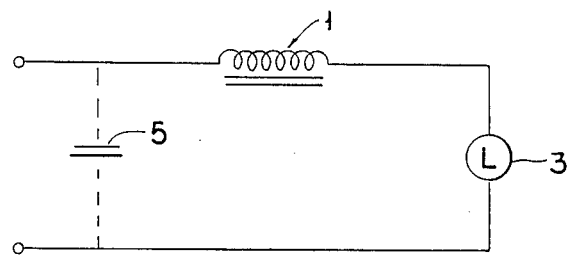
Figure 6:
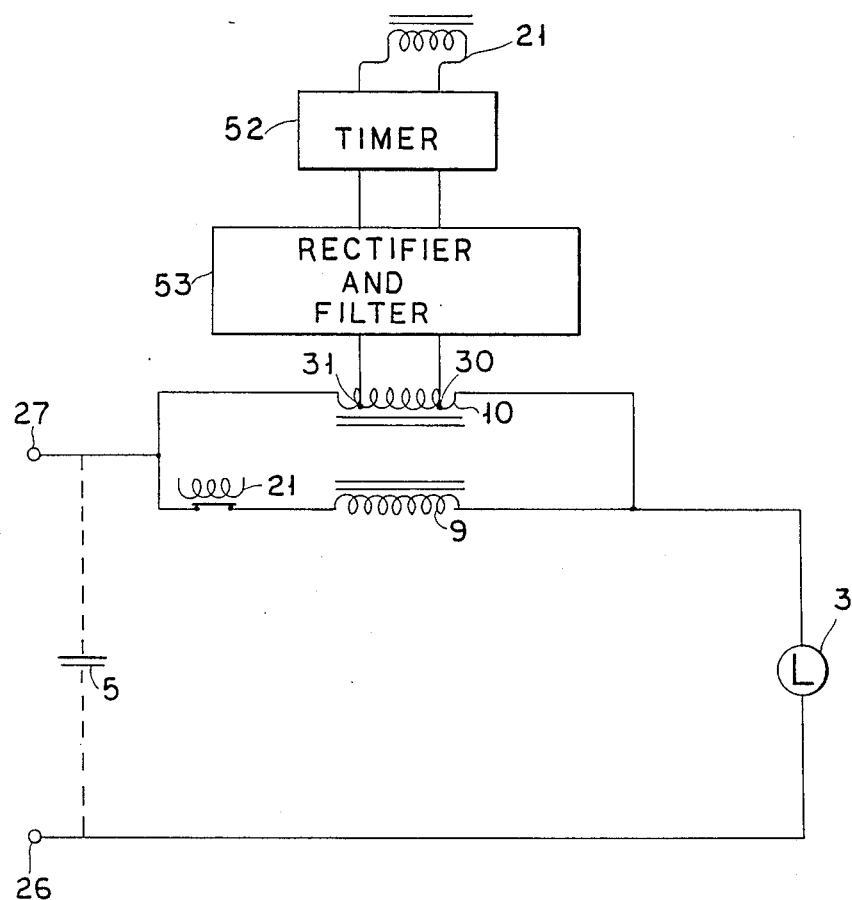

In FIG. 5 is shown a common or garden ballast for a mercury vapor lamp, and in FIG. 6 can be seen the power-saving ballast for the same mercury vapor lamp.

Its principle is the same as that previously described.

Figure 7:
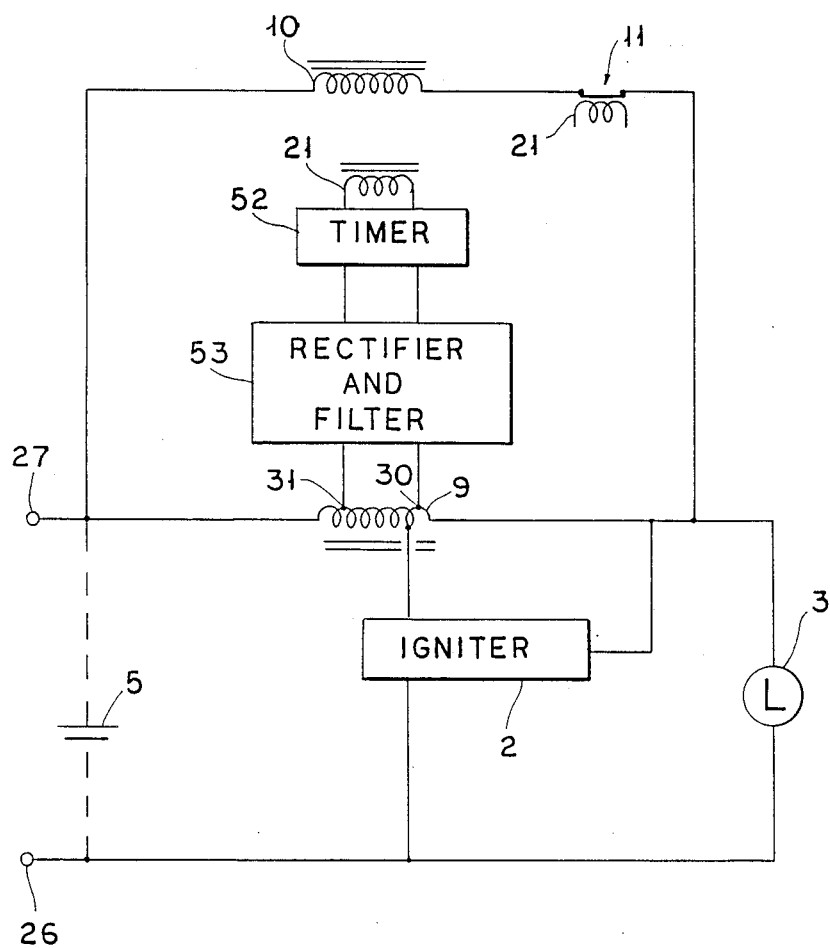

In FIG. 7 another possibility is shown for construction of the power-saving ballast (for a high-pressure sodium vapor lamp), in which the modification of the total inductance of the circuit is obtained disconnecting the inductance 10 by means of the contavts 11 of the relay, as a result of stimulating the spool 21 of the relay through the timer 52.

Figure 8:
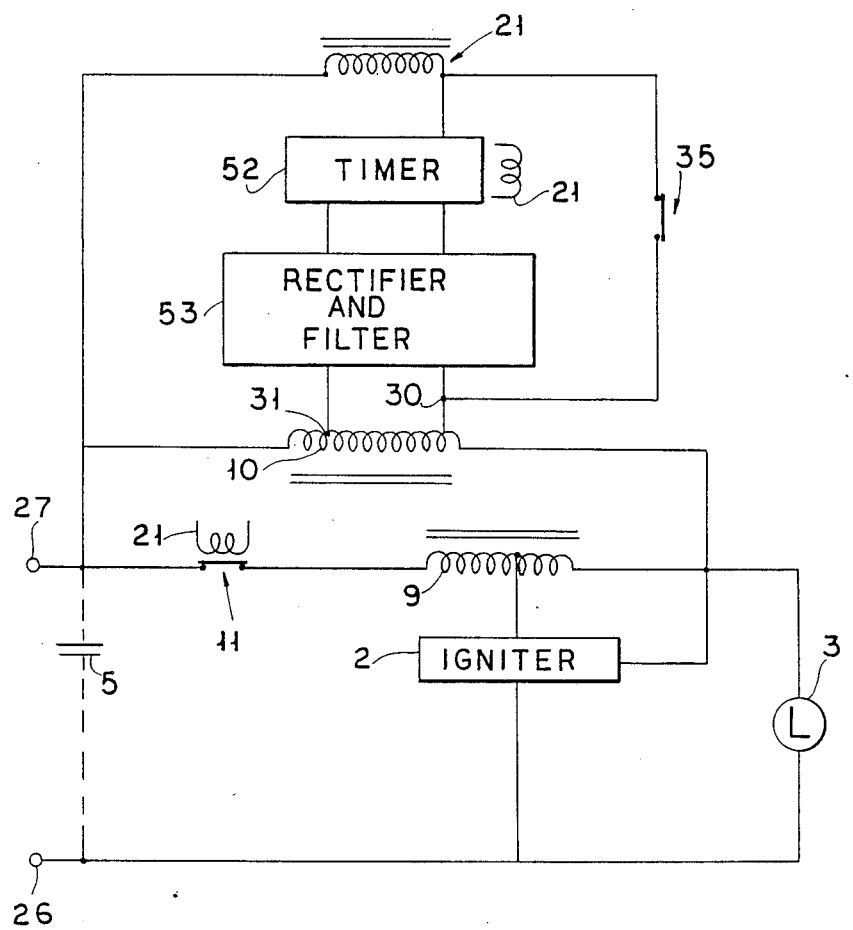

In FIG. 8 is shown another possibility for constructing the power-saving ballast, where the principal variation is that here the relay is fed with alternating current.

When timer 52 momentarily activates the relay through its stimulator spool 21, the relay closes the contacts 35 (which are normally opened), and opens contacts 11 which are normally closed.

Upon closing contacts 35, the relay goes on operating (stimulated) as long as electric power is reaching the ballast, since through these contacts 35 the stimulating current of the spool is circulating and while there is stimulation in the spool, contacts 35 will be closed.

At the same time, contacts 11 open, and inductance 9 is disconnected, therefore the inductance of the system will be formed only by inductance 10 and will be greater than the original value; this increase in the inductance results in a reduction in the potency of the lamp and consequently in the consumption of electric power of the system.

Figure 9:
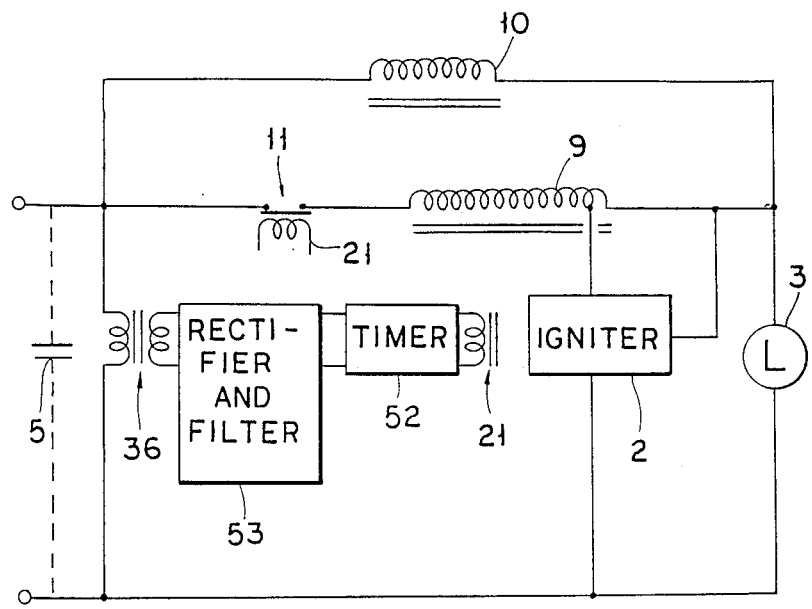
Figure 10:
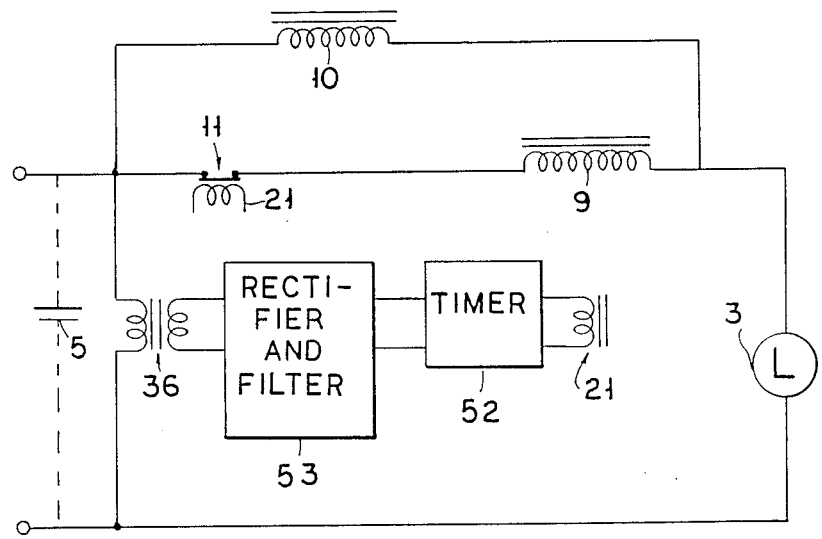

In FIGS. 9 and 10 there is another possibility shown for construction of the power-saving ballast. FIG. 9 corresponds to the ballast for a high-pressure sodium lamp, and FIG. 10 for a mercury vapor lamp.

The feature of this other possibility is that the relay, all the timer and discharge circuit and the rectifying and filtering device are connected to the feed line by means of a transformer 36.

The transformer 36 feeds itself from the A.C. line voltage and at its outlet provides a voltage reduced in value which the rectifying and filtering device converts to D.C. (direct current) and which it delivers to the timer.

This timer activates the stimulator spool 21 of the relay and makes this open its contacts 11 disconnecting inductance 9, thus achieving an increase in the total inductance of the circuit, reducing the current of the lamp and reducing the electric power consumed as was explained in the prior cases.

Figure 11:
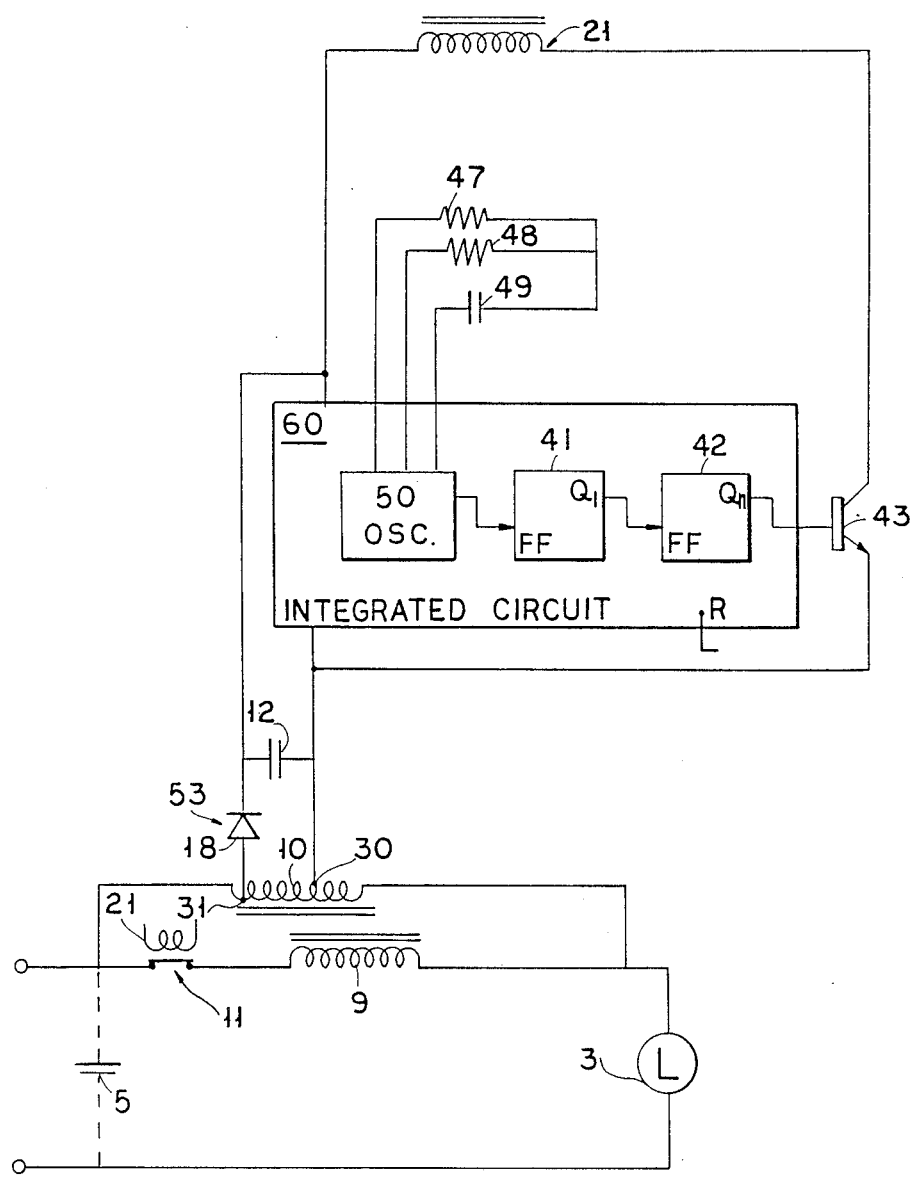

In FIG. 11 a possibility is exemplified for construction of both the rectifying and filtering device and the timer.

In this possibility the rectifying and filtering device is made up of a diode 18 that rectifies the voltage from A.C. and a condenser that filters, and gives us at its outlet a D.C. (direct current) voltage.

The timer in this case is achieved through using an integrated circuit 60 which contains an oscillator and a series of bistable multivibrators (also known as flip flops).

The oscillator oscillates with a certain frequency through resistors 47 and 48 and condenser 49, and this signal is sent to the bistable multivibrators stages; these multivibrators 41, 42, etc. are internally connected from the outlet of one to the inlet of the other. The different stages can be integrated in one single integrated system, or they can be contained in variuos integrated circuits.

Each multivibrator stage goes dividing into two the frequency of the oscillator 50, producing at its outlet logical stages of (one) and (zero).

The last multivibrator produces its logical stage 1 (one) at its outlet with the previously set delayed time by means of the values of the resistors 47 and 48 and of the condenser 49.

The outlet of the last multivibrator is coupled to the stimulator spool of the relay, through a transistor 43, in such a way that when there is an outlet one (1) in it, spool 21 is stimulated, the relay operates and opens the contacts 11, and disconnects the inductance 9, causing the increase in the total inductance of the circuit and therefore causing the reduction in the current of the lamp, which brings about a reduction in the electric power that the ballast consumes.

The transistor 43 (as was seen before) may be coupled directly to the spool 21, or may use 2 transistors, whether of the normal bipolar type or of field effect (FET) or be coupled to a thiristor.

Figure 12:
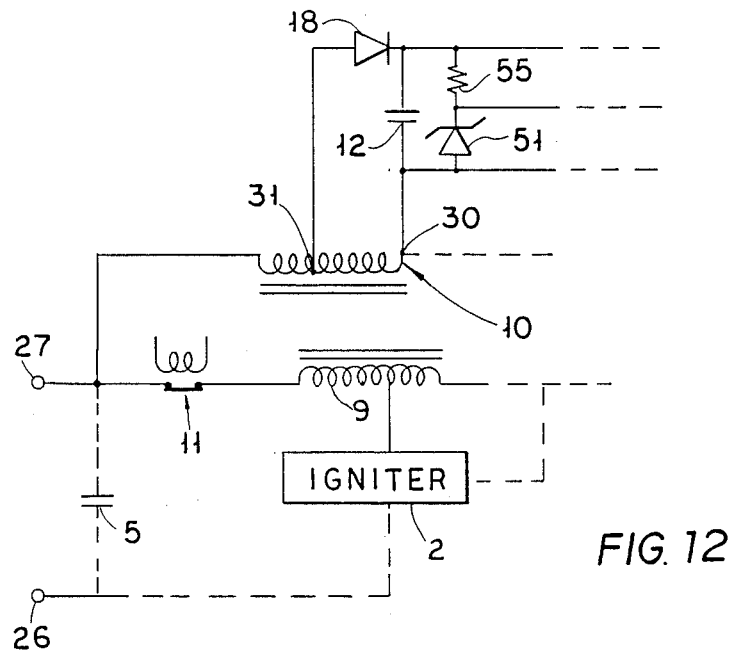
Figure 13:
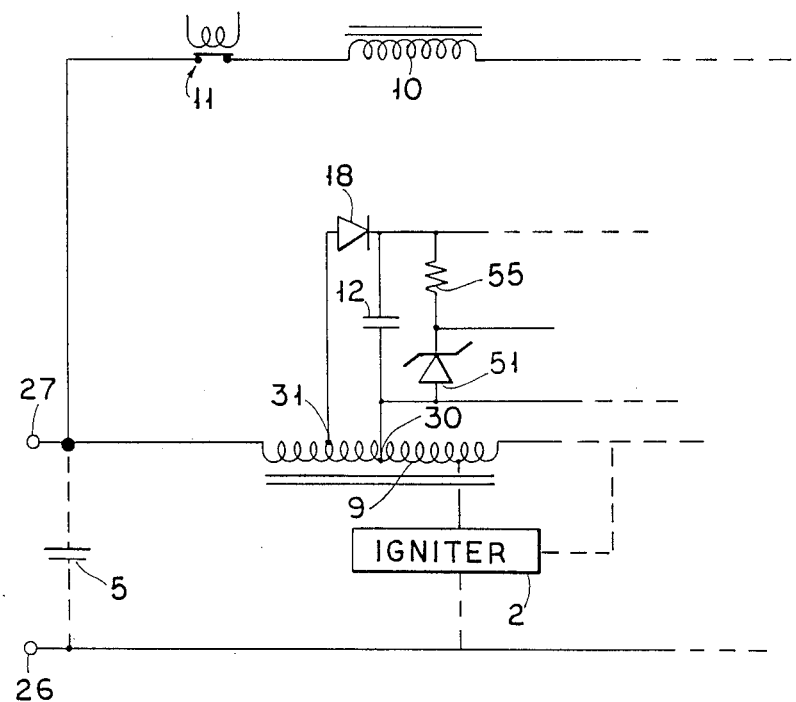

Naturally in all the cases and versions shown in the FIGS., the power intake indicated in points 31 and 30 may be carried out in any pair of derivations of inductances 9 and 10, as shown in FIGS. 12 and 13 in addition to those previously mentioned.

Furthermore, and as an option, one may use a voltage regulating system such as a zener diode 51, and a resistor 55 to regulate the electric tension and obtain delayed times which are more stable as is also seen in FIGS. 12 and 13.

For the readjustment to zero (RESET) of the integrated circuit(s), one may use any of the presently well-known methods for this purpose.

Below are mentioned some of the possibilities for construction of the timers illustrated in the previously-described FIGS.

Referring to the power-saving ballast using the advanced regulated circuit or the self-transforming self-regulating one, below is presented the description of same.

Figure 14:
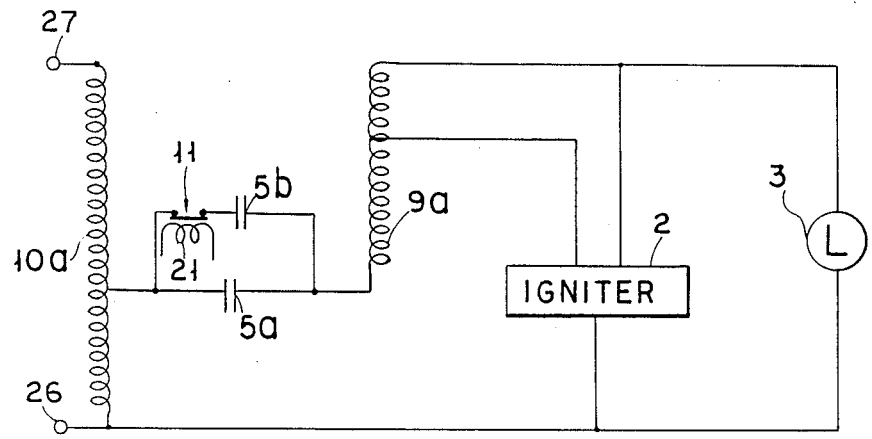

In FIG. 14, there is demonstrated the diagram of a normal ballast for operating a high-pressure sodium vapor lamp, in which can be seen the primary winding 1, the secondary winding 2, both magnetically joined by forming an autotransformer; the ignitor 3 (an electronic device which is used to produce, in combination with the secondary winding 2, a pulse of high voltage necessary to light the lamp), the lamp 4, and a section of capacitance formed by 2 or more condensers connected in parallel (in this diagram represented by the condensers 5 and 6).

Figure 15:
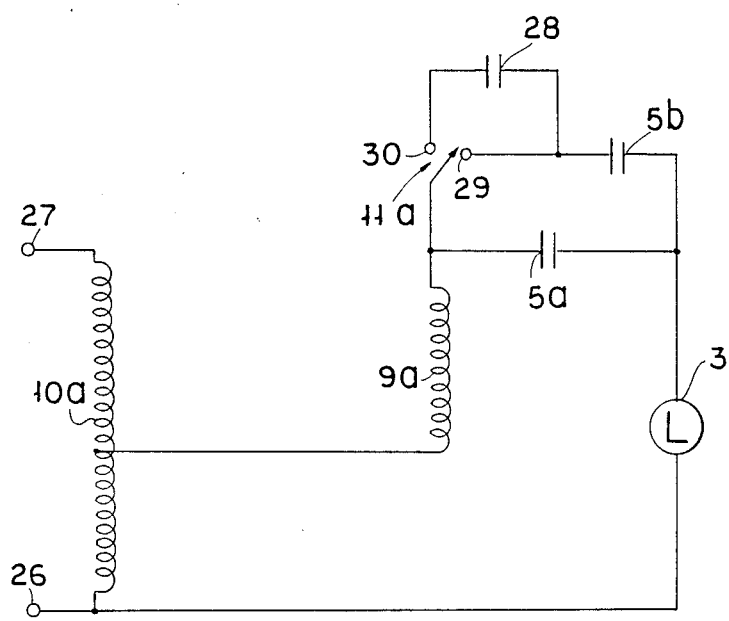

In FIG. 15, there appears the diagram of ignitor 3 mentioned in FIG. 14. This ignitor consists of a condenser 18, a resistor 20, an inductance or spool 19 and a discharge device which in this case is a SIDAC 21 (Bidirectional Diode of Silicon for A.C.).

Figure 16:
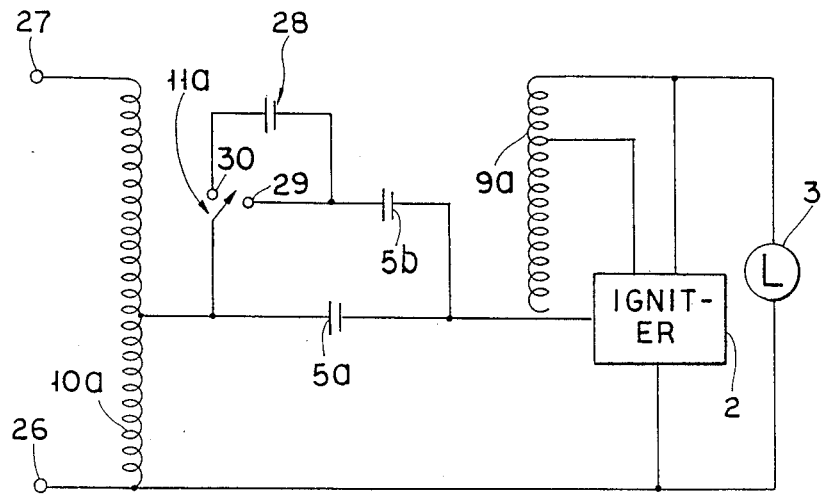

In FIG. 16 can be found the diagram of the ballast for high-pressure sodium vapor like that which appears in FIG. 14 but with a basic difference which is the switch 7, which are actually the contacts of a relay which will be described in FIG. 17. This switch 7 is the element that connects or disconnects the condenser 6 to the rest of the circuit, thus modifying its functioning, as will be seen further on.

Figure 17:
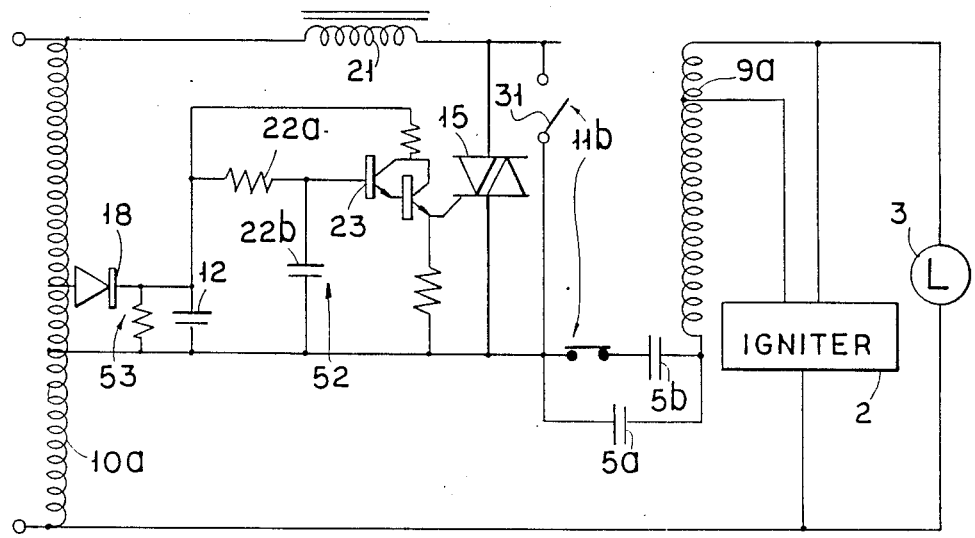

In FIG. 17, there is the diagram of the complete ballast, in which can be appreciated the primary winding 1, the secondary winding 2, both belonging to the auto-transformer, the ignitor 3, the lamp 4, the condensers 5 and 6, the switch or pair of contacts 7 of the relay, 2 condensers 8 and 10, the resistors 9, 11, 12 and 14, a diode 16, a pair of transistors 22 and 23, the stimulator spool 13 of the relay, a semiconductor of controlled conduction or thiristor 15, which can be a TRIAC or a SCR (Controlled Rectifier of Silicon).

The way in which it operates is as follows:

FIRST PHASE. The initial operation of the ballast consists of lighting the lamp. For this, what happens is that upon kicking in the primary winding 1, there is presented in the secondary winding 2 a magnetically-induced voltage, and which in combination with the voltage between points 25-33 which is part of the voltage of the primary winding, there is formed the open circuit voltage which is presented at the ends of the lamp 4.

However the high-pressure sodium lamp will only light when it has been supplied with not only that open circuit voltage, but a pulse of voltage of high value between 2,000 and 5,000 volts (depending on the lamp). The ignitor 3 is the device that in combination with the secondary winding 2 provides this pulse, and it does so in the following manner:

In FIG. 15, one may see that the voltage between points 36-33 which is the open circuit voltage to the lamp, is divided between condenser 18, resistance 20 and inductance 19.

The condenser 18 has at its ends an alternating current voltage to which it goes gradually charging with a certain delayed time.

This voltage, added to the voltage between the points 34-36, is presented at the ends of the discharge device 21 (SIDAC). This discharge device 21 has the feature that when the voltage in its ends is higher than the voltage value of discharge of the same device, this passes to a conductive stage and stays in it as long as the current which circulates through it does not go below a certain value.

Thus, in a cycle of alternating current, from the point of zero voltage, the voltage between the ends of condenser 18 to which this is charging, added to the voltage which exists between points 34-36, is increased from zero volts, and is present at the ends of the discharge device SIDAC 21; when this voltage is higher than the minimum value of discharge of this device, the SIDAC 21 passes to a conductive state, allowing that through it the condenser 18 be discharged on section 37 of the secondary winding (located between points 34 and 36) producing a voltage pulse of a low value; the number of turns between the winding from point 34 to 38 is many times greater than the winding 37 between points 34 and 36, so that there is a relationship of transformation of elevation of voltage between those windings and when the condenser 18 is discharged on winding 37. This voltage pulse is raised due to the relationship of transformation of elevation of voltage previously mentioned, and between points 34-38 there is obtained the voltage pulse elevated many times, which is transmitted through the section of capacitance 5 and 6, and the section of primary winding between points 25 and 33, until reaching the lamp, causing it to light.

SECOND PHASE. Having lighted the lamp, it keeps it operating at its normal capacity for a predetermined time which can be from 5 to 7 hours, and that corresponds to the nocturnal vehicular and pedestrian traffic that is most important, and this job is carried out with the elements: primary winding 1, secondary 2, ignitor 3, lamp 4, and the section of capacitance formed by the total of the sum of capacities of the condensers 5 and 6, and which regulate the current that circulates through the lamp, and therefore regulate the potency and emission of luminosity of same. On this phase the contacts 7 are found closed because they are N.C. (normally closed).

THIRD PHASE. From the beginning of the operation of the lamp between points 24-25, an A.C. (alternating current) voltage is presented, that rectifies the diode 16 and with the help of condenser 8 which operates as a filter, it keeps between points 26-25 a direct current (D. C.) voltage.

The stimulator spool 13 of the relay is not energized, since although there is a D.C. voltage between points 26-25, the thiristor 15 has the feature of normally being in a non-conductive state of current until it has been discharged by an appropriate voltage in its discriminator electrode or gate electrode, therefore as long as there is no such condition, this thiristor does not conduct, and thus since the spool is not permitted to stimulate, the contacts 7 stay closed.

The condenser 10 tends to charge itself at the same voltage as the condenser 8 and it starts to charge itself through resistor 9, and with a resulting time constant from the combination of values of the resistor 9 and the condenser 10. The voltage between the points 27–25 will go gradually increasing. This same voltage is present in the base of the transistor 22. The transistor 22 and the 25 are connected in a configuration known as Darlington, which serves to amplify the voltage found in the base of the first transistor 22, and to deliver it in the emissor of the second transistor 23, with the important feature that the base of the first transistor hardly takes any current from point 27, that is, it does not charge the condenser 10, since this configuration has a high input impedance.

The voltage between the points 27–25, the pair of transistors-deliver it in point 28 which corresponds to the emissor of the second transistor, the magnitude of voltage in 28 being approximately equal to that in point 27 (with regard to point 25 or common point).

Thus the magnitude of this voltage goes increasing (because the voltage between 27-24 also goes increasing) until it is higher than the minimum gate voltage of thiristor 15 (also known as minimum discharge voltage), and this(the thiristor) passes to a conductive state, allowing current to pass from point 26 through stimulator spool 13 of the relay and then through the same thiristor 15 and up to point 29 (that is common with point 25) with which the relay is energized and this therefore acts opening contacts 7: the opening of contacts 7 causes condenser 6 to disconnect and cease operating and leaves only condenser 5 functioning, with which the total capacitance of the circuit diminishes, and as a result the current which passes on to lamp 4 reduces, and this reduces its potency.

This reduction of potency of lamp 4 is reflected in the primary winding 1 also as a reduction in potency and therefore as a reduction in the consumption of power.

FOURTH PHASE. When the lighting operation reaches the end of its time, the supply ballast of electric power disconnects itself, and the lamp turns off.

The thiristor 15, after current stops flowing through it, passes to its non-conductive state. Stimulator spool 13 of the relay kicks out and therefore contacts 7 close (since they are normally closed) and the condenser 6 stays connected to condenser 5 in parallel.

On the other hand, condenser 10 starts to discharge itself, first through transistors 22 and 23 and resistor 11, and later through resistor 9 and resistor 14, in a predetermined period that is in proportion to the values of condensers 10 and 8 and of resistors 9 and 14, until it becomes, finally, totally discharged and ready to commence the next cycle.

Figure 18:
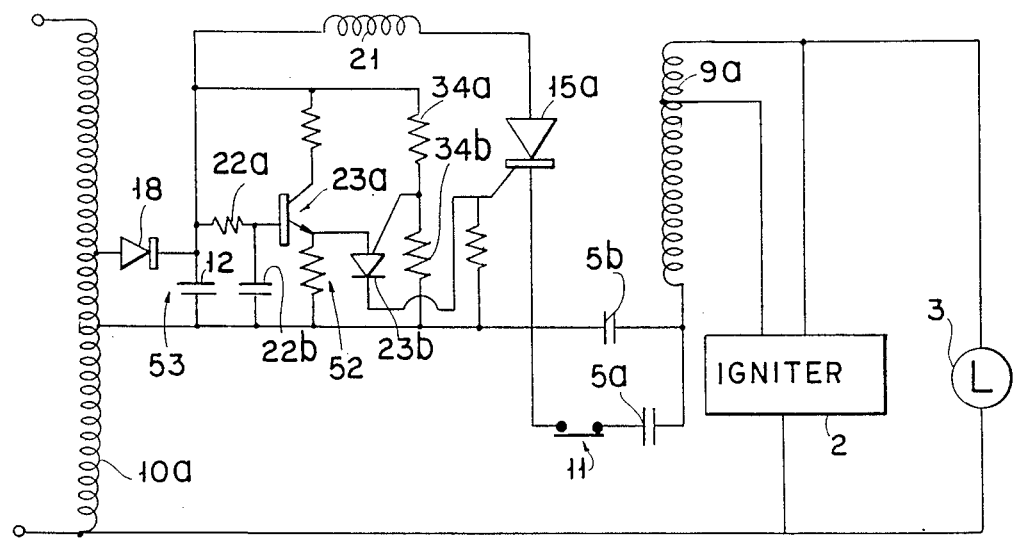
Figure 19:
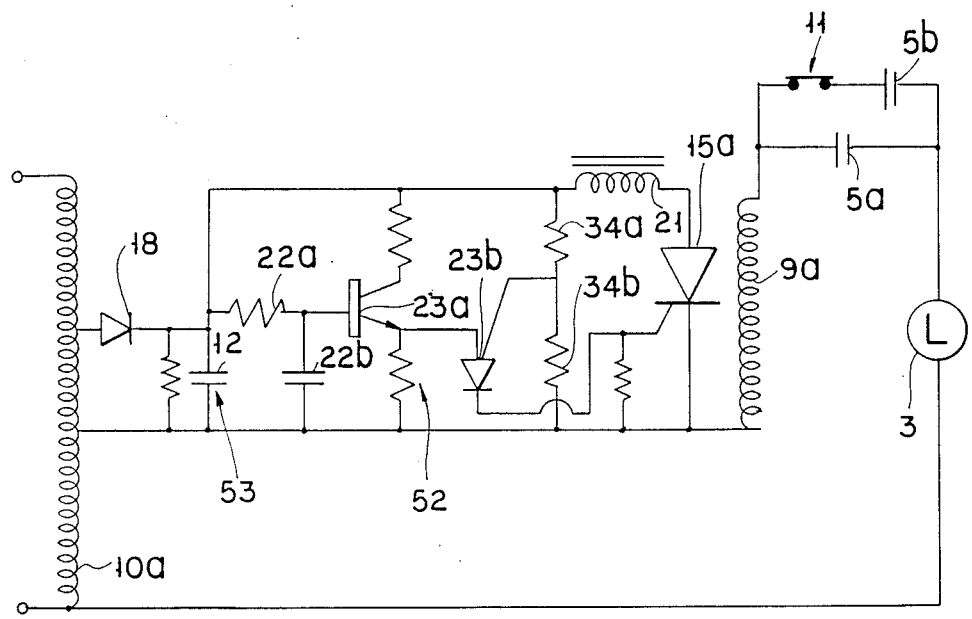

In FIG. 18 is shown a common or garden ballast for a mercury vapor lamp, and FIG. 19 demonstrates a power-saving ballast for the same mercury vapor lamp.

Its operating principle is the same as that previously described.

Figure 20:
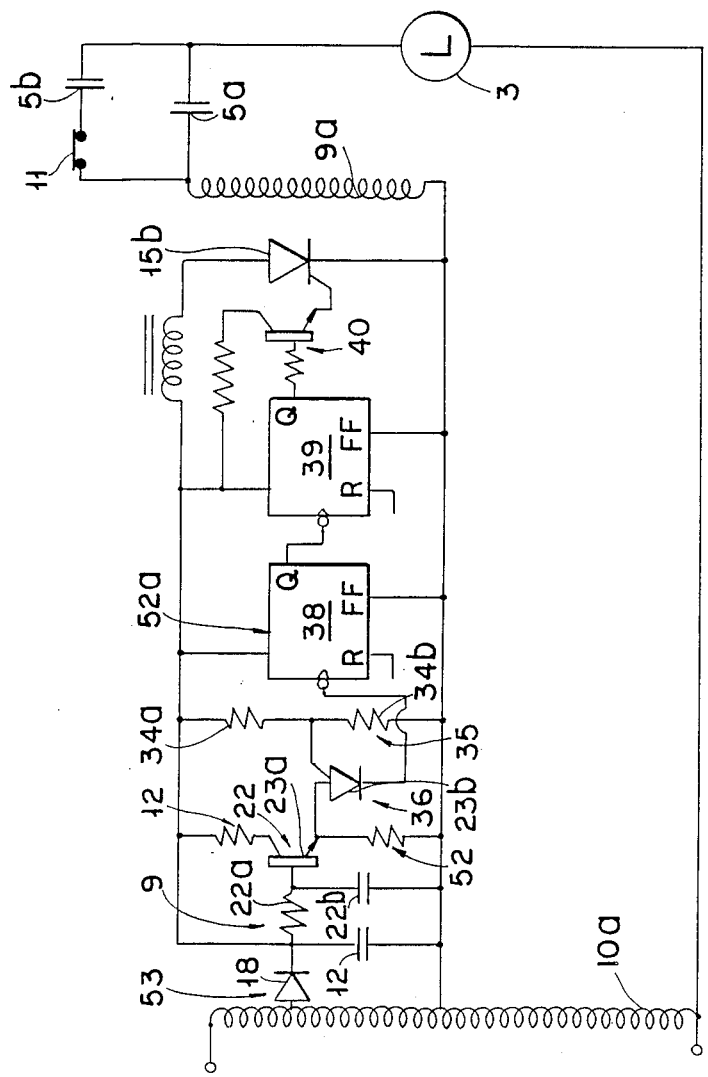
Figure 21:
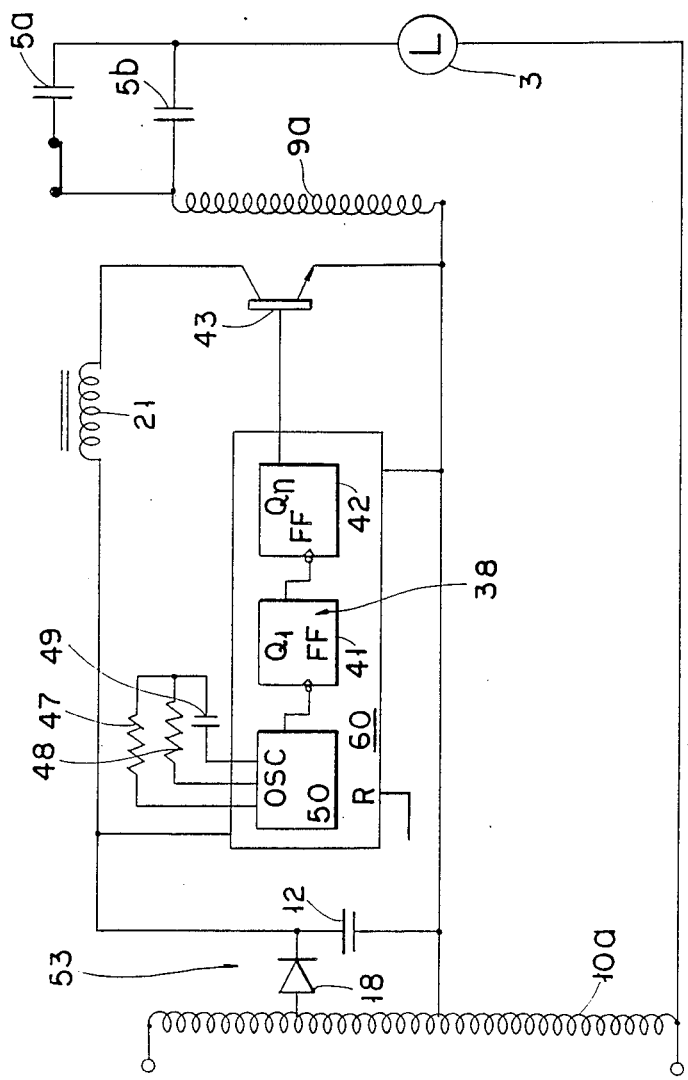

In FIGS. 20 and 21 is seen another possibility for constructing the power-saving ballast (FIG. 20 for a mercury vapor lamp and FIG. 21 for a high-pressure sodium vapor lamp), in which the modification of the capacitance is achieved with switch 7 of 1 pole, 2 shots controlled by the relay, and in which the switch is normally found in position 29 (when the stimulator spool of the relay has been kicked out).

When the stimulator spool of the relay is energized, switch 7 passe to position 30, connecting condenser 28 in series with condenser 6 and both are connected in parallel with condenser 5.

Upon connecting condenser 28 to condenser 6, in series, the equivalent capacitance of those two condensers decreases to below the value of capacitance of condenser 6; and upon connecting these 2 condensers in parallel to condenser 5, the resulting total capacitance is less than the total capacitance of just condensers 5 and 6 connected in parallel.

This reduction in capacitance causes the reduction of current of the lamp and therefore the decrease in potency of same, and in the potency of the Ballast Line.

Figure 22:
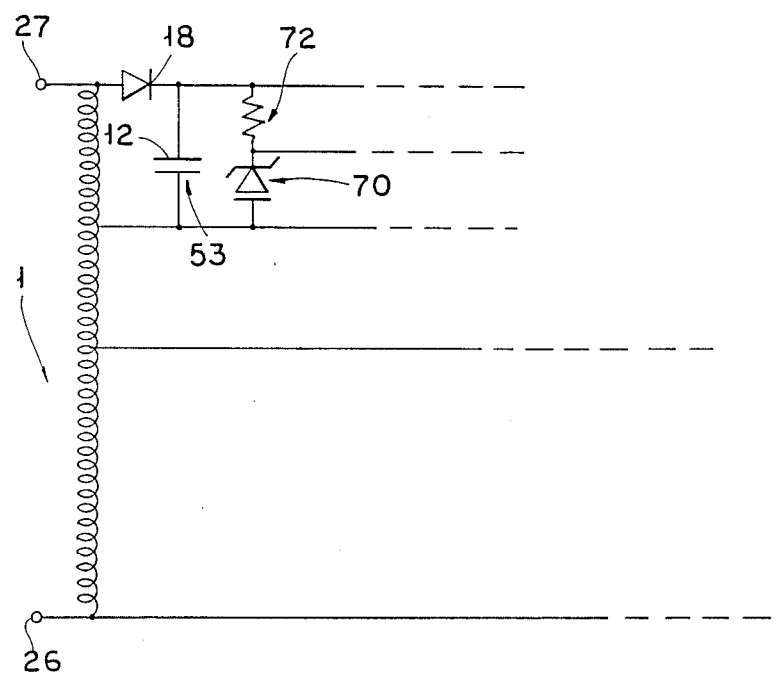

In FIG. 22 is shown another possibility for construction of the power-saving ballast, where the principal variant is that here the relay is fed with alternating current.

When the timer formed by the resistor 9 and the condenser 10, with the help of transistors 22 and 23 will discharge the thiristor 15 (just as explained previously), this passes to the conductive state during some cycles, sufficient so that current may circulate through the stimulator spool 13 of the relay, and this activates in consequence closing contacts 31 (which are normally open) and opening contacts 7 (which are normally closed).

Upon closing contacts 31, the relay continues operating (stimulated) as long as there is no lack of electric power to the ballast, since through these contacts 31 there is current from the stimulation of the spool circulating, and as long as there is stimulation in the spool, the contacts 31 will stay closed.

At the same time, the contacts 7 open up and the condenser 6 is disconnected and therefore the capacitance of the system will be formed only by condenser 5 and will be less than the original value; this reduction in the capacitance translates to a reduction in potency of the lamp and consequently in the consumption of electric power of the system.

In FIGS. 23 and 24, there is shown another possibility of construction of the power-saving ballast. FIG. 23 corresponds to the ballast for a high-pressure sodium lamp, and FIG. 24 for a mercury vapor lamp.

The feature of this other possibility is that the relay and all the circuit of time and of discharge are found in the primary.

The transformer 32 is fed from the line voltage and provides at its outlet a voltage of diminished value, which the diode 16 takes care to rectify and condenser 8 to filter, so that in point 26 we have the same direct current voltage as in the previously explained cases.

In the same way, the process for the delay in time achieved with condenser 10 and resistance 9, the discharge of thiristor 15 with the help of transistors 22 and 23, the stimulation of spool 13 of the relay and the reduction in the total capacitance as the result of disconnecting condenser 6 by means of contacts 7, are performed in an equivalent or analogous way as was previously explained.

In FIGS. 25 and 26 there is shown another possibility of construction of the power-saving ballast; FIG. 25 corresponds to the ballast for a high-pressure sodium vapor lamp, and FIG. 26 for a mercury vapor lamp.

The feature of this other possibility is that only a transistor 22 is used which is coupled to the voltage to which condenser 10 is charging itself, and this voltage is delivered by it to the anode of a transistor of programmable unijoint (P.U.T.) 36.

This transistor has as its characteristic that while the voltage applied between its anode and its cathode does not go higher than the voltage applied between its gate electrode or discriminator electrode and its cathode, there will be no conduction between anode and cathode.

In this case, the voltage of the gate electrode is obtained with a voltage divider formed by the resistances 34 and 35.

That is to say that as condenser 10 is being charged, this voltage is found in the anode of the transistor of programmable unijoint 36, thanks to transistor 22, and when this voltage reaches the value of the voltage in the discriminator electrode determined by the resistances 34 and 35, the unijoint transistor passes to the conductive state, and achieving with this that current circulates to the discriminator electrode of thiristor 15, and this passing (thiristor 15) to the conductive state, and allowing that through it current circulates, to energize the stimulator spool of the relay, and this activates in consequence opening contacts 7, causing the reduction in the total capacitance of the circuit, and therefore the reduction of current of the lamp, which translates to a reduction of the electric power consumption of the ballast, just as was explained in the previous cases.

The resistance 37 may be utilized to avoid false operations of the thiristor, upon its discriminator or gate electrode being connected to potential zero.

In FIGS. 27 and 28 there is shown another possibility of construction of the power-saving ballast; FIG. 27 corresponds to the ballast for a high-pressure sodium lamp, and FIG. 28 for a mercury vapor lamp.

The feature of this other possibility is that the time of delay in which the relay is activated is obtained adding to the previous circuit (represented in FIGS. 25 and 26) at the outlet of the programmable unijoint transistor (P.U.T.) 36, one or various stages of bistable multivibrators 38, 39, etc. (known as flip-flops), the main feature of which is that its outlet consists of logical states of one (1) and zero (0), and changing from one logical state to another as a result of a discharge in the inlet of the multivibrator.

For every 2 discharges they receive at their inlet, they provide one at their outlet which in turn will be applied to the next multivibrator or stage.

Thus each multivibrator or stage will divide into 2 the number of pulses or shots.

If 2 stages are used, it will be divided into 4, and if 3 stages are used, the number of pulses will be divided into 8.

These stages of multivibrators may be formed by discreet elements or may be contained in an integrated circuit.

The last multivibrator or stage presents at its outlet a logical state of one (1), with a total delayed time of approximately between 5 and 7 hours, which is the time foreseen to activate the relay.

At the outlet of this last multivibrator, a transistor 40 is connected, which serves to couple the outlet to a triac or S.C.R. 15 (controlled rectifier of silicon) and this latter discharging through its discriminator electrode when the outlet of the last multivibrator is (1) one.

When the thiristor discharges, it passes to its conductive state, and as current passes through it, the relay spool is activated, and this opens its contacts 7, causing the reduction in the total capacitance of the circuit, and consequently the reduction of the lamp current, which translates to a reduction on the consumption of electric power of the ballast just as was explained in the previous cases.

In FIGS. 29 and 30 are shown two other variants of construction of power-saving ballasts; FIG. 29 corresponds to a high-pressure sodium vapor lamp, and 30 to a mercury vapor lamp.

The feature of this other variant is that the delay period in which the relay is activated is achieved by means of using an integrated circuit 41 which contains an oscillator and a series of stages of bistable multivibrators, (as in the preceding case).

The oscillator oscillates with a frequency determined by the resistors 44 and 45 and by the condenser 46, and this signal is sent to the stages of bistable multivibrators; these multivibrators 38, 39, etc. are internally connected the outlet of one to the inlet of the next. The different stages can be integrated within the same integrated circuit, or they can be contained in various integrated circuits.

Each stage of multivibrator goes dividing into two, the frequency of oscillator 50, presenting at its outlet logical states of (one) and (zero).

The last multivibrator presents its logical state (one) one at its outlet with the necessary delayed time (approx. 5 and 7 hours), and the outlet of this multivibrator is coupled by means of the transistor 40, to another transistor 47 or a thiristor 15ike the previous circuits presented in FIGS. 27 and 28.

The transistor 47 or the thiristor 15 activate in turn the spool of the relay, in such a way that its contacts 7 open, causing the reduction of the total capacitance of the circuit, and therefore the reduction of the lamp current, which means a reduction in electric power consumption of the ballast just as explained in the previous cases.

The transistor 40 can be a Darlington transistor, and can be coupled directly to the stimulator spool of the relay,(that is, does not need the second transistor 47 or the transistor 15). Also one can use as transistor 40 a normal bipolar transistor or a field effect transistor (F.E.T.) coupled directly to the stimulator spool of the relay.

Of course in all cases and versions shown in FIGS. 17, 19, 22, 25, 26, 27, 28, 29 and 30, the power intake indicated in points 24 and 25 can be carried out in any pair of derivations of the primary or secondary spools, as is demonstrated in FIGS. 31 and 32, in addition to those mentioned before.

Furthermore and as an option, one may use a zener diode 42 and a resistor 43 to regulate the electric tension and obtain more stable delay periods, as can be seen in FIGS. 31 and 32.

For the readjustment to zero (reset) of the integrated circuit(s), use may be made of any of the methods presently well known for this purpose.

Even when the invention has been described in accordance with the preferred method in order to be materialized, it should be understood that as well as the alternatives described throughout the description, some others will be obvious and shall be covered within the scope of the protection of the invention, which shall only be limited by the scope of the following.

I claim:

1. In a ballast for operating one of a high-pressure sodium-vapor and a mercury-vapor lamp from a source of electric power, the ballast having a first one of a condenser and an inductor connected to be in series between the lamp and the source of electric power, the improvement comprising:
 a second of the one of the condenser and inductor connected in a path that is connected in parallel with the first one of the condenser and inductor;
 a timer for providing a predetermined time;
 connecting means for connecting the timer to the source of electric power; and
 a relay in the path for closing the path, the timer providing the predetermined time only to the relay for opening the path;
 whereby the electric power consumed by the ballast for operating the lamp is reduced when the relay has opened the path.

2. The ballast of claim 1, wherein the source of electric power comprises a third inductor, and the connecting means comprises a rectifying and filter device.

3. In the ballast of claim 2, wherein the first one of the condenser and inductor is a first inductor, the improvement wherein:
 the second of the one of the condenser and inductor is a second inductor; and
 the third inductor is a portion of a winding for one of the first and second inductors.

4. The ballast of claim 3, wherein the first, second and third inductors are operative with the same magnetic field.

5. The ballast of claim 3, wherein the first and second inductors are operative with different magnetic fields.

6. The ballast of claim 2, wherein the third inductor comprises a primary winding for connection to an electric power feed line, and the connecting means further comprises a secondary winding responsive to the primary winding for providing electric power to the rectifying and filter device.

7. The ballast of claim 1, wherein the relay further comprises latching means responsive to the source of electric power for keeping the path open after the relay has opened the path so long as the source of electric power provides electric power.

8. The ballast of claim 4, wherein the relay further comprises latching means responsive to the source of electric power for keeping the path open after the relay has opened the path so long as the source of electric power provides electric power.

9. The ballast of claim 5, wherein the relay further comprises latching means responsive to the source of electric power for keeping the path open after the relay has opened the path so long as the source of electric power provides electric power.

10. The ballast of claim 1, wherein the connecting means further comprises a voltage regulator.

11. The ballast of claim 4, wherein the connecting means further comprises a voltage regulator.

12. The ballast of claim 5, wherein the connecting means further comprises a voltage regulator.

13. In the ballast of claim 1, wherein the first one of the condenser and inductor is a first condenser, the improvement wherein the second of the one of the condenser and inductor is a second condenser.

14. The ballast of claim 13, wherein the connecting means comprises a rectifying and filter device.

15. The ballast of claim 13, and further comprising a third condenser connected at one end of the path, and wherein the relay further comprises pole means at an opposite end of the third condenser and responsive to the opening of the path for connecting the second and third condenser in series with each other and in parallel with the first condenser.

16. The ballast of claim 14, and further comprising a third condenser connected at one end to the path, and wherein the relay further comprises pole means at an opposite end of the third condenser and responsive to the opening of the path for connecting the second and third condenser in series with each other and in parallel with the first condenser.

17. The ballast of claim 13, wherein the relay further comprises latching means responsive to the source of electric power for keeping the path open after the relay has opened the path so long as the source of electric power provides electric power.

18. The ballast of claim 14, wherein the relay further comprises latching means responsive to the source of electric power for keeping the path open after the relay has opened the path so long as the source of electric power provides electric power.

19. The ballast of claim 15, wherein the relay further comprises latching means responsive to the source of electric power for keeping the path open after the relay has opened the path so long as the source of electric power provides electric power.

20. The ballast of claim 13, wherein the connecting means further comprises a transformer at the source of electric power.

* * * * *